(12) United States Patent
Tenaud et al.

(10) Patent No.: US 6,755,988 B1
(45) Date of Patent: Jun. 29, 2004

(54) METHOD FOR MAKING FERRITE MAGNETS

(75) Inventors: Philippe Tenaud, Bernin (FR); Eric Brando, Forcalquier (FR)

(73) Assignee: Ugimac, S.A., Saint-Pierre-d'Allevard (FR)

( * ) Notice: Subject to any disclaimer, the term of this patent is extended or adjusted under 35 U.S.C. 154(b) by 0 days.

(21) Appl. No.: 10/130,290

(22) PCT Filed: Oct. 10, 2000

(86) PCT No.: PCT/FR00/02817

§ 371 (c)(1),
(2), (4) Date: Jul. 10, 2002

(87) PCT Pub. No.: WO01/40137

PCT Pub. Date: Jun. 7, 2001

(30) Foreign Application Priority Data

Nov. 30, 1999 (FR) ............................................. 99 15093

(51) Int. Cl.[7] ........................ C01G 49/00; C01G 51/00; H01F 1/10; H01F 41/02
(52) U.S. Cl. ................................. 252/62.63; 252/62.57
(58) Field of Search ............................ 252/62.63, 62.51

(56) References Cited

U.S. PATENT DOCUMENTS 6,086,781 A * 7/2000 Taguchi et al. .......... 252/62.57
6,419,847 B1 * 7/2002 Toyota et al. ............ 252/62.57

FOREIGN PATENT DOCUMENTS

| EP | 905718 | 3/1999 |
|----|--------|--------|
| EP | 964411 | 12/1999 |
| EP | 1052658 | 11/2000 |

* cited by examiner

Primary Examiner—C. Melissa Koslow
(74) Attorney, Agent, or Firm—Dennison, Schultz, Dougherty & MacDonald (57) ABSTRACT

A method for making ferrite magnets of formula $M_{1-x}R_xFe_{12-y}T_yO_{19}$ including: a1) forming a powder mixture MP of related raw materials, a2) transforming into granules in green state A, b) calcining the granules in green state to form clinker B, c) wet grinding clinker B to obtain a homogeneous dispersion of fine particles C, d) concentrating and compressing the particles under an orienting magnetic field to form an anisotropic green compact D, and e) sintering the green compact to obtain a sintered element E. In step a1), MP is formed from a dry mixture MS of M and Fe powder elements and a dispersion DF of raw materials related to elements R and T, and in step b) the granules in green state are calcined to obtain a clinker B which is homogeneous in chemical composition and size and with apparent low density, between 2.5 and 3.5.

20 Claims, 4 Drawing Sheets

METHOD FOR MAKING FERRITE MAGNETS

FIELD OF THE INVENTION

The invention relates to the field of permanent magnets, and more particularly to magnets of the ferrite type comprising the magnetoplumbite type.

DESCRIPTION OF RELATED ART

The present invention relates to permanent magnets of the ferrite type based on the magnetoplumbite phase $MFe_{12}O_{19}$ with M=Sr,Ba,etc . . . , in which the element M is partially substituted by an element R chosen from among the rare earths or bismuth, and in which the element Fe is partially substituted by at least one transition metal T.

Such magnets are already known for their high magnetic properties, as disclosed in the Japanese patent application J10-149910 or in the European patent application EP-0 905 718 or in the international patent application WO99/34379.

In these patent applications, lanthanum La is generally used as the element M, and cobalt Co as element R.

Manufacture of such magnets comprises the following stages:
  a) formation of a mixture of raw materials either by wet process to form a dispersion, or by dry process to form granules,
  b) calcination of the mixture up to 1250° C. to form a clinker, or fire clay, comprising the magnetoplumbite phase required, said mixture, under either dispersion form or granular form, being introduced into a calcination furnace.
  c) wet grinding of the clinker until an aqueous dispersion of particles of around 1 μm is obtained, under the form of a paste with about 70% dry extract
  d) the paste is concentrated and compressed under an orienting magnetic field of about 1 Tesla and under a pressure of 30 to 50 MPa in such a way as to obtain an anisotropic "green compact", with about 87% dry extract.
  e) after drying and elimination of the remaining water, sintering of the green compact,
  f) final machining to obtain the magnet of the defined shape.

SUMMARY OF THE INVENTION

The major problem of magnets according to the state of the art described above is their very high cost. In fact, the substitution elements La and Co are very expensive, lanthanum being much more expensive than strontium, and cobalt oxide being about 200 times more expensive than iron oxide.

In any case, the aim of the invention is therefore to increase the quality/price ratio of present magnets, either by increasing their performance, or by lowering their price, or by playing on the two factors simultaneously.

The aim of the invention is a method making it possible to achieve this, together with the magnets obtained by this method.

DETAILED DESCRIPTION

According to the invention, in the manufacturing method for permanent magnets of the ferrite type comprising a magnetoplumbite phase, formula $M_{1-x}R_xFe_{12-y}T_yO_{19}$ in which M=Ba, Sr, Ca, Pb, and R=Bi or elements of the rare earth group, T=Mn, Co, Ni, Zn, and with x and y comprised between 0.05 and 0.5:
  a1) one forms in a mixing means, typically a mixer operating by batch, a pulverulent mixture MP of raw materials relative to the elements M, R, Fe and T, typically under the form of oxide, carbonate, hydroxide, etc., comprising water in a predetermined quantity, typically needed for the formation of granules in the subsequent stage,
  a2) next one transforms, typically in a granulator operating continuously, said mixture of "green compact" pellets A, with possible addition of supplementary water,
  b) one calcinates said "green compact" granules to form a clinker B, with a magnetoplumbite base of formula $M_{1-x}R_xFe_{12-y}T_yO_{19}$,
  c) one carries out a wet grinding of said clinker, typically in an aqueous medium, to obtain a homogeneous dispersion C of fine non-agglomerated particles of average particle size lower than 1.2 μm,
  d) one concentrates and compresses said particles under an orienting magnetic field to form an anisotropic "green compact" D which can be manipulated, to the pre-determined shape,
  e) said anisotropic green compact is sintered to obtain a sintered element E,
  f) possibly, a final dimensioning of said sintered element is carried out, typically by machining, to obtain the final magnet F, the method being characterised in that:
    1) at the stage a1) of the method, said mixture is formed, by introducing in said mixing means, a dry mixture MS of powders corresponding to said raw materials relative to the elements M and Fe and a homogeneous fluid dispersion DF of said raw materials relative to the elements R and T typically in said pre-determined quantity of water,
    2) at stage b) of the method, said green granules A are calcinated at a chosen temperature and for a chosen length of time,
  in such a way as to obtain, at the end of stage b), a clinker B which is both homogeneous in chemical composition and in size, and in apparent density, comprised between 2.5 and 3.5 and which is easy to grind in stage c).

The method according to the invention is clearly different from the methods according to the present state of the art. In fact, the applicant has been able to compare the methods according to the state of the art and those according to the invention, all other things remaining equal. It was noted that the differences of method led to great differences of final magnetic performance of the magnets and/or manufacturing cost. Different hypotheses are put forward below and the facts observed are interpreted as follows:

A) Comparison of the Method According to the Invention with the State of the Art Wet Process In this state of the art method, a dispersion of raw materials is formed in water and then the dispersion formed is introduced directly into the calcination furnace, typically a rotary furnace operating continuously and, at the exit from the furnace, the clinker B is recuperated.

In this method, the chemical composition of the dispersion to be calcinated is very homogeneous, and thus also that of the clinker B obtained; on the other hand, the sizes of the clinkers obtained at the end of calcination is very heterogeneous, and typically extends from 0.5 mm to 10 mm.

A clinker size is considered to be homogeneous when the spread $T_M-T_m$ (difference between the maximum size and the minimum size) is lower than the average of these values $(T_M+T_m)/2$.

The applicant has observed that, during the wet grinding of the stage c), it was impossible to grind this clinker to obtain a dispersion C of particles of homogeneous particle size and centred around 1 µm, doubtless because the granules of small size are ground more quickly than the granules of large size, the ratio of sizes being typically between 1 to 20 and even more By using this method, the applicant has noted the formation of ultra-fine particles, namely of typical particle size lower than 0.3 µm. These particles are known to pose several disadvantages:

- on the one hand, the concentration at the stage d), typically by filtration, is expensive because of the high level of losses (the finest particles being carried away with the water) and because of the length of time of filtration or concentration, taking into account the presence of ultra-fine particles obstructing the filtration media,
- on the other hand, the ultra-fine particles cannot be oriented by the orienting field, because their magnetic couple is too low, which results in a final magnet with remanence Br which is too weak.
- furthermore, the time and the energy required for grinding these ultra-fine particles are pure losses in cost.

B) Comparison of the Method According to the Invention and the Dry Process According to the State of the Art In the method according to the state of the art, the first stage a1) comprises the formation of a mixture of powders MP comprising all the constituents of the final magnet together with the major part of the quantity of water needed for the formation of the granules of stage a2), and then this pulverulent mixture MP is transformed into green granules A at stage a2). In order to achieve this, a granulator is typically used in which one introduces, continuously, on the one hand the MP mixture of powders and, on the other hand, the quantity of supplementary water needed for the formation of the granules, while extracting the green granules A formed continuously. It can be observed that the granules A obtained, generally under the form of "balls", have a relatively homogeneous size, ranging typically from 4 to 6 mm in equivalent "diameter". Furthermore, after calcination, one obtains a clinker B with approximately the size of the granules A introduced into the calcination furnace. Such a clinker makes it possible, with varying lengths of grinding time, to obtain a dispersion C and, after filtration, a paste whose particle size distribution is better than that obtained with the wet process, since it is narrower and better centred around about 1 µm.

However, following these investigations, the applicant became convinced that, in the case in particular of magnets comprising partial substitution elements—elements R and T, typically La and Co respectively, added in relatively low quantities, the magnets of the state of the art obtained by this method did not provide optimum properties.

In fact, within the framework of her work on the manufacturing methods, the applicant studied different ferrites and, in particular, measured the values of the field of anisotropy Ha, especially in function of the nature of the element M and the degree of substitution x and y of the ferrite, by the SPD (single point detection) method, such as described by Messrs. G. Asti and S. Rinaldi in the Journal of Applied Physics, Vol 45, No 8, August 1974, pages 3600 to 3610.

This method consists of measuring the magnetisation "m" of the clinker B in function of an applied field H, and of producing a graph of the curve $d^2m/dH^2$ in function of H: the field of anisotropy Ha is equal to the field H for which $d^2m/dH^2$ has a single point.

The applicant observed, as proved by the measurements carried out on the clinker B and on the magnets E or F of tests 1a to 6c, that this method makes it possible to reach the value of Ha, even from a raw magnetic material and practically isotropic such as a clinker.

The applicant noted, as will be seen in the examples, that the value of Ha obtained is practically the same, whether the latter is measured on a clinker B, relatively isotropic, or on a final magnet (E or F) obtained after sintering, relatively anisotropic, such that this value Ha is evidently an intrinsic property of a clinker of a given ferrite material, a value independent from orientation and particle size, and therefore from all the processes of the stages after stage b) for synthesis of the magnetoplumbite phase.

Thus, it seems that this value Ha is independent, once the magnetoplumbite phase has been formed, from the processes of grinding, compacting and sintering, and generally from the micro-structure and the particle size which may result from processes after stage b), which proves to be very useful for understanding the phenomena under study.

Furthermore, by comparing the values of Ha and the final magnetic properties (Br, HcJ and shape factor of a hysteresis cycle) for different materials and in function of different manufacturing processes for the clinker B, the applicant has made several observations and has presented the hypotheses leading to the present invention:

- on the one hand, the applicant found that, in certain cases, and particularly in the case where the mixture of elements, in stage a), is made by the so-called wet process, the ferrites substituted by R and T of the state of the art showed final magnetic properties which were too weak, and not in relation to their relatively high values of Ha,
- on the other hand, the applicant came to the conclusion that, for a given composition of a magnet, typically defined by M, R, T, x and y, it was the so-called wet process which made it possible to obtain the highest values of Ha, these values, measured on the clinker, flattening out as soon as the clinker B typically reached a density of at least 2.5.

The applicant has presented the hypothesis that, in these conditions, these maximum values of Ha obtained were the maximum intrinsic values characteristic of a given magnet composition, very close to the properties measured on a monocrystal of the same composition.

Consequently, the applicant considered that the comparison between the values of Ha measured on the clinker B obtained in a given process and the intrinsic values of Ha could be a measure of the chemical homogeneity of the clinker, or furthermore of the degree of transformation into the magnetoplumbite phase.

Thus, the applicant discovered that, particularly in the case where the formation of green granules A, in stage a), is carried out by the so-called dry process of the state of the art, the level of Ha of the clinker thus obtained was too low, taking into account the chemical nature of the elements M, R and T of the ferrite, compared to the intrinsic values of Ha of clinkers obtained by the so-called wet process, of the same chemical nature, and all other things being equal, especially the calcination conditions. Thus the applicant, after having put forward the hypothesis according to which the relatively low level of performance of ferrite magnets substituted by R and T could come from an insufficiently complete transformation of said mixture into the magnetoplumbite phase, the clinker obtained by the dry process not having a sufficiently homogeneous nor sufficiently rich chemical composition in the magnetoplumbite phase, next put forward another hypothesis and presumed that this could result from insufficient homogeneity of the chemical composition of the green granules A at the beginning, at their entry into the calcination furnace. The applicant explored this track, which led to modifying the method of stage a1), as mentioned above.

Continuing this work, the applicant also studied the calcination of green granules A obtained according to the invention, and observed that a sector of optimum density existed for the clinker obtained according to the invention, following the calcination stage.

In fact, she noted that, in the case of green granules according to the invention, the magnetic performances of the magnets were better when the apparent density d. of the clinkers B formed were comprised between 2.5 and 3.5.

To explain the existence of this area, the applicant put forward the following hypotheses, understanding that it is already known that the density of clinker rises with the temperature and the length of the stay in the calcination furnace:

on the one hand, above an apparent density of 2.5, it seems that the clinker has a heterogeneous chemical composition, and certainly too low a content in ferrite of the magnetoplumbite type, as if the formation reaction of the ferrite was incomplete, on the other hand, above an apparent density of 3.5, the clinker becomes harder and it can be considered that, as a result of a longer grinding time to obtain the same average particle size, more ultra-fine particles are formed which, as already mentioned above, do not contribute to the final magnetic properties which, in the two cases, can contribute to limiting the final magnetic performances.

Thus, the applicant developed a process which cumulates the advantages of the two methods known in the present state of the art, without having the disadvantages, and which makes it possible to form a clinker with both a high homogeneity of size and chemical structure and with a high level of magnetoplumbite phase.

This method according to the invention is thus a combination of two means, one of which concerns the homogeneity of the chemical composition of the green granules A to be calcinated and therefore that of the clinker B formed after calcination—the size or size-distribution of the green granules A being little modified during calcination, and the other of which concerns control of the calcination of the green granules A, not by the temperature itself but by the apparent density of the clinker B formed, these two means having been diagnosed as essential by the applicant, for improving the value of the anisotropy field Ha and the final magnetic properties of the magnets.

Since calcination furnaces typically operate continuously and there is a bi-univocal relation between the apparent density da of the clinker and the calcination temperature, itself a function of fuel consumption of the means of heating the furnace—typically a gas burner, it is simple to pilot and regulate the consumption of the burner according to the measurement of apparent density of the clinker at the exit from the calcination furnace.

It is well known that the measurements of temperatures in continuous rotary furnaces, carried out typically by optical pyrometers, are relatively imprecise, less as far as the measurement itself is concerned, than for the very heterogeneous temperature distribution in each of the portions of space or volume of the furnace. It is therefore very advantageous to be able to pilot a furnace without using this type of temperature measurement, even though temperature measurements are still used, in particular for verifying continuously and in real time the stability of operation of the furnace.

As will be shown in the comparative tests, the results obtained with the method according to the invention have shown a very clear improvement in the magnetic performance of magnets E and F, all other things being equal, which allows one to consider that the hypotheses of the applicant are valid without any doubt.

DESCRIPTION OF THE FIGURES

These measurements were taken on clinkers obtained by the so-called wet process, with a homogeneous mixture and calcination conditions sufficient for forming the totality of the magnetoplumbite phase, and thus corresponding to a maximum value for Ha, typically obtained with a clinker of density greater than 2.5.

stage a1) is aimed at forming, typically discontinuously by batch, a pulverulent mixture MP to be granulated. For this, a first dry mixture MS of materials is formed, typically oxides, carbonates or hydroxides, carriers of elements Fe and M (typically equal to Sr or Ba), in a dry mixer 1, and a second fluid mixture under the form of a fluid dispersion DF by introducing into a disperser 2 under agitation, water, a deflocculating or dispersing agent referenced "PEI" and the materials, typically oxides, carbonates or hydroxides, carriers of the elements R (typically La) and T (typically Co) and after this one introduces the dry mixture MS and the fluid dispersion DF in a mixer by batch 3, of the powder mixing type, to form the pulverulent mixture MP, stage a2) is aimed at transforming, in a granulator 4 operating continuously, the pulverulent mixture MP in green granules referenced "A" and represented here in the form of little "light" rings, stage b) comprises the calcination of green granules A in a calcination furnace 5, typically inclined and operating continuously, which leads to the formation of the clinker referenced "B" and represented here by little "dark" rings, stage c) for grinding the clinker "B" typically comprises a stage of dry grinding and a stage of wet grinding in a dispersing grinder 6 to obtain a particle size close to the order of a micrometer, which leads to a dispersion "C" of fine particles, or the corresponding paste after filtration. Only the wet grinding has been drawn, grinding during which one can incorporate additives useful for the sintering of stage e).

stage d), for compression and orientation leads to a block "D" of oriented magnetic particles.

stage e) for sintering leads to a magnet under the form of a block "E" of particles linked together.

The final stage f) of shaping or machining of the final machined magnet F has not been shown.

FIGS 5a to 5c show, as ordinates, the magnetic properties in function of the content z, as abscissa in %, in ferrites substituted in a mixture of substituted ferrite and corresponding non-substituted ferrite, according to examples 7 to 10 and 1c.

According to the invention, these two parameters Ha and $d_a$ condition and determine all the final magnetic properties of the magnets E:

Ha must be as high as possible and, in the particular case of ferrites of Sr substituted by La and Co, preferably higher than 1670 kA/m, in order to achieve sufficient chemical homogeneity, that is to say a content of magnetoplumbite phase as high as possible. A dotted line shows the maximum value obtained in the trials (Ha=1830 kA/m), such that the criss-crossed central zone shows the domain of the clinkers obtained in these trials.

the apparent density $d_a$ must be comprised between 2.5 and 3.5: a value lower than 2.5 would mean insufficient chemical homogeneity, and a value higher than 3.5 would imply too long a grinding time and, as a result, the formation of too great a quantity of ultra-fine particles.

DETAILED DESCRIPTION OF THE INVENTION

According to the invention, said fluid dispersion DF can comprise:

water: 55 to 85% by weight element R (expressed in oxide form): 10 to 30% by weight element T (expressed in oxide form): 5 to 15% by weight.

Figure 4:
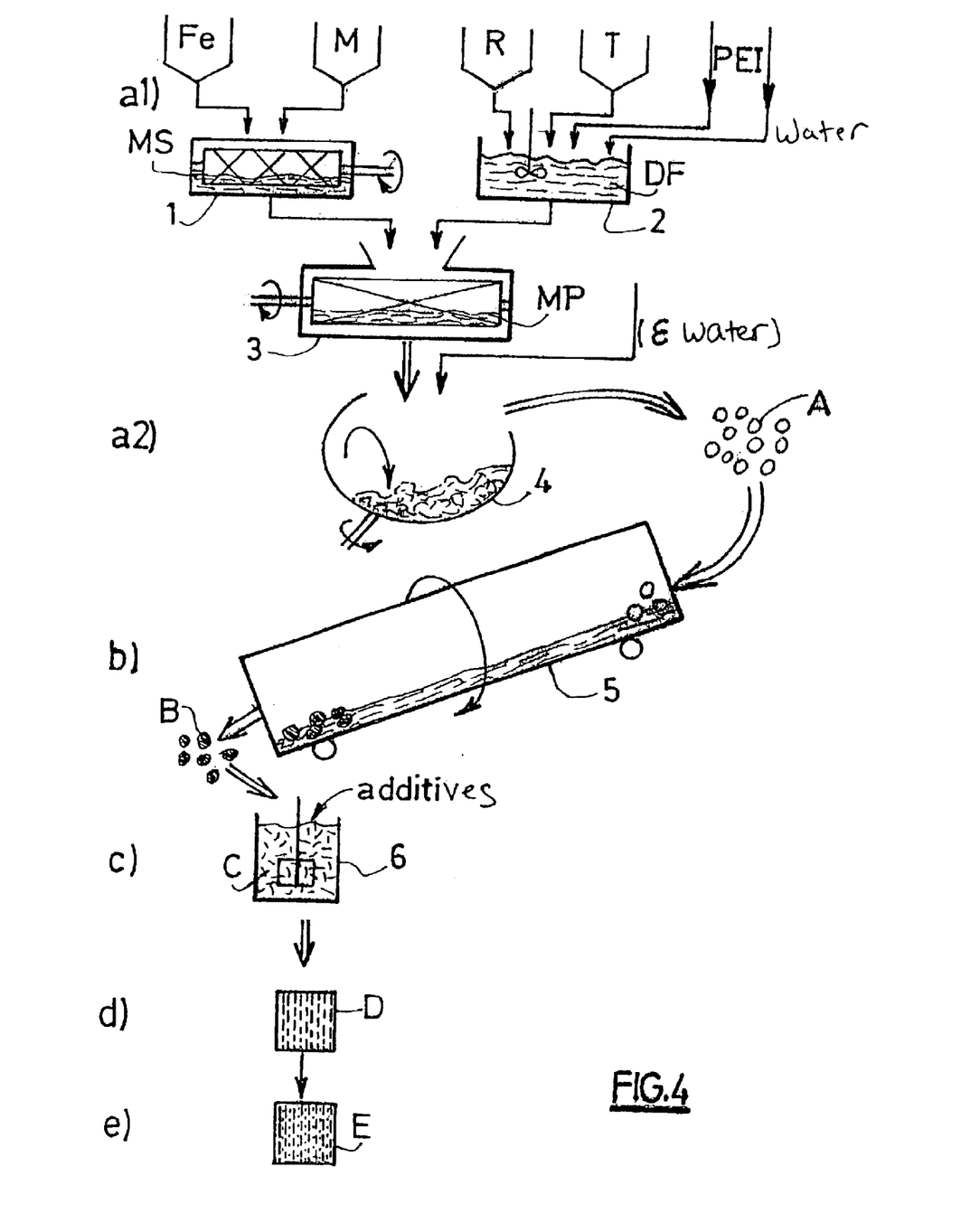
FIG. 4 is a drawing of the principle stages of the method according to the invention.

Furthermore, said fluid dispersion DF can comprise a deflocculating or dispersing agent, chosen by nature and by weight content in such a way as to obtain a dispersion having both sufficiently low viscosity for the dispersion to be able to flow or be pumped from the disperser 2, and having a fineness of dispersion such that the average sizes of the particles or agglomerates relative to the elements R and T are less than 25 μm (measured by passage through the corresponding filter screen).

This deflocculating or dispersing agent can be present in the dispersion at a weight content typically comprised between 0.5 and 2%, namely at the minimum content necessary for obtaining a fluid, homogeneous and stable dispersion.

These dispersing agents can act by electrostatic action or through steric effect, and they are known themselves for obtaining aqueous dispersions of mineral particles, especially in the domains of paints or inks. One can use anionic polymers (for example ammonium polyacrylates) or cationic polymers (for example polyethyleneimines (PEI) neutralised by nitric acid).

According to the invention, one can introduce into said mixer 3, typically discontinuously by batch, or possibly continuously, said dry mixture of powders MS, which provides the elements Fe and M, and said fluid dispersion DF, which provides the elements R and T, 0.1 to 0.2 liters of said fluid dispersion DF being introduced per kilogram of said dry mixture MS. See FIG. 4.

This ratio between the dispersion volume DF and the weight of the dry mixture MS ensures both the stoichiometry needed to form the ferrite in the required magnetoplumbite phase, plus nearly the total quantity of water need to form the green granules A of stage a2). But it should be noted that the mixture MP remains typically under the form of a pulverulent mixture, even though already containing the major part of the water required for granulation of the pulverulent mixture MP.

Said fluid dispersion DF must preserve its fineness and homogeneity until it is introduced into the powder mixer 3 such that, preferably, it is maintained under agitation permanently to avoid any sedimentation of powders corresponding to the inputs of elements R and T.

Preferably, at stage b), said calcination is carried out in the calcination furnace 5 at a temperature sufficiently high to form the magnetoplumbite phase and over a length of time chosen in order to obtain a density from 2.7 to 3.1, and preferably to obtain a density from 2.75 to 3. These values make it possible to obtain simultaneously a good compromise between a yield or level of chemical reaction in magnetoplumbite phase which must be as high as possible, and an apparent density which must be as low as possible, both in order to reduce the grinding time and thus raise productivity, and above all to limit the quantity of ultra-fine particles which form during the grinding of the ferrite clinker.

Preferably, the calcination takes place under an atmosphere comprising a significant excess of oxygen with a partial oxygen pressure greater than 0.1 atmospheres.

According to the invention, one can choose the elements M, R, T and the values of x and y, in such a way that, at the end of stage b), said clinker B has a value of anisotropy field Ha typically at least equal to 1592 kA/m, and preferably greater than 1671 kA/m at 20° C.

More preferably, the elements M, R, T and the values of x and y can be chosen in such a way that, at the end of stage b), said clinker has a value of anisotropy field Ha at least equal to 1711 kA/m at 20° C. For this, one preferably chooses ferrites of Sr rather than ferrites of Ba.

Figure 1:
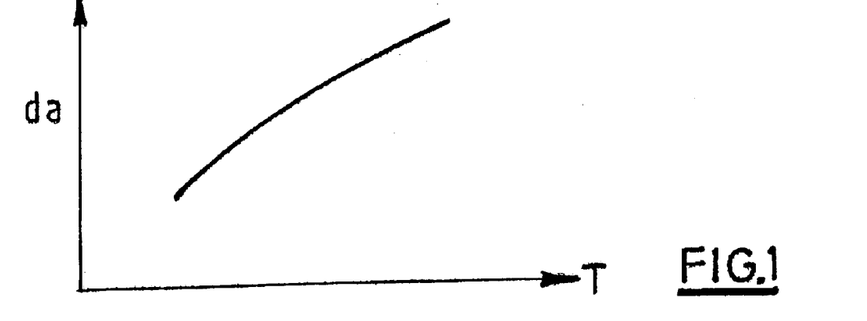
FIG. 1 shows schematically the relationship between the calcination temperature T, as abscissa, and the apparent density $d_a$, as ordinate, of the clinker B obtained, for green granules A starting with the same chemical composition.
Figure 2:
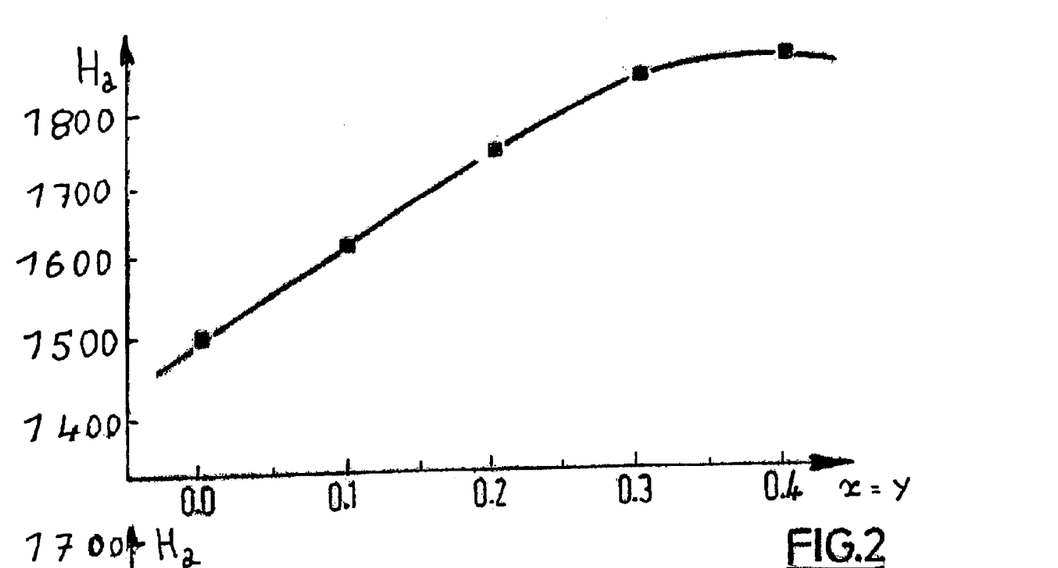
FIGS. 2 and 3 are curves giving, as ordinate, the intrinsic values of the field of anisotropy Ha (in kA/m) at 20° C., of ferrites of formula $M_{1-x}R_xFe_{12-y}T_yO_{19}$ with R=La and T=Co, and M=Sr for FIG. 2 and M=Ba for FIG. 3, and as abscissa the values of x and y, with x typically taken equal to y.
Figure 3:
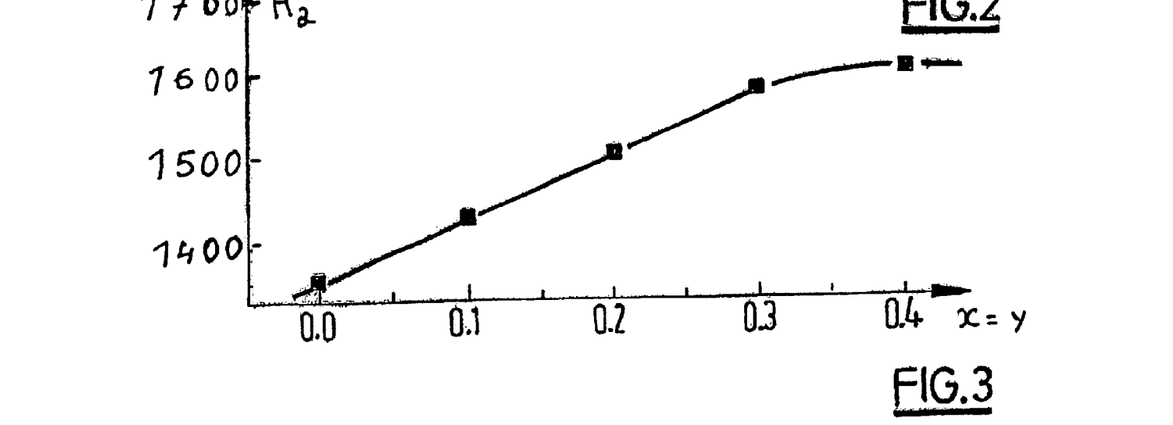

However, in the case of ferrites of the formula $M_{1-x}R_xFe_{12-y}T_yO_{19}$ with M=Sr, R=La, and T=Co, the applicant chose values for x and y comprised between 0.10 and 0.35, and preferably between 0.15 and 0.25, x typically being taken equal to y, even though higher values of Ha are possible with higher values of x, y, as shown in FIGS. 2 and 3. In fact, it should be noted that, according to the observations of the applicant, the optimum magnetic performances of the ferrite magnets E or F obtained are not situated, as might be expected for high values of x and y, typically x and y>0.35, which lead to the highest values of Ha, as shown in FIGS. 2 and 3, but rather for values of x, y, close to 0.2. In order to explain this phenomenon, the application has put forward the hypothesis that the yield of the transformation into magnetoplumbite phase of the initial mixture during calcination must doubtless become lower for increasing values of x and y, at least with the method according to the invention. Thus, the domain in which x, y, have values from 0.15 to 0.25 appears to be an optimum domain which, according to the hypotheses of the applicant, can constitute the best compromise between a high value for the field of anisotropy Ha, which increases with x, y, and the yield of transformation into magnetoplumbite phase of the initial mixture, which, according to a hypothesis of the applicant, would decrease with x, y.

In stage d) of the method according to the invention, said particles can be compressed under a pressure of 30–50 MPa under orienting magnetic field of about 1 Tesla, to form an anisotropic green compact D.

According to an advantageous embodiment of the invention, a method according to the invention can be used in which:

1) a clinker of ferrite B' of formula M $Fe_2O_{19}$, a non-substituted ferrite is provided;
2) it is mixed with said clinker of ferrite B of formula $M_{1-x}R_xFe_{12-y}T_yO_{19}$, according to the invention, typically during said stage c) of the method according to the invention, in such a way as to obtain permanent magnets at the least cost, and with a higher performance/cost ratio.

The proportion by mass z of clinker B of formula $M_{1-x}R_xFe_{12-y}T_yO_{19}$ in the mixture of the two clinkers B and B' can be comprised between 0.20 and 0.80 and, preferably, between 0.30 and 0.70.

Advantageously, one applies the same criteria to said clinker B' of formula M $Fe_2O_{19}$ as far as the apparent density at the end of calcination is concerned, which must be comprised between 2.5 and 3.5.

Figure 5A:
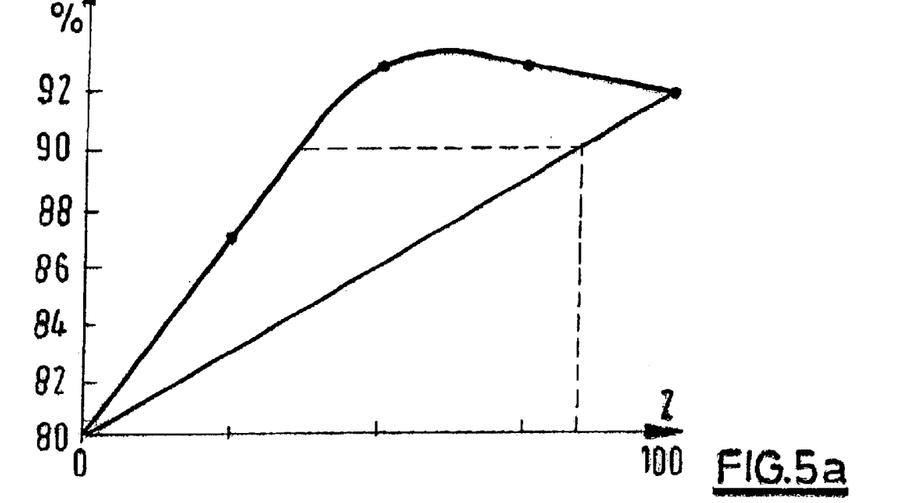
FIG. 5a shows a synergy effect of the ratio Hk/HcJ: the "square" character of the hysteresis cycle is in %.
Figure 5B:
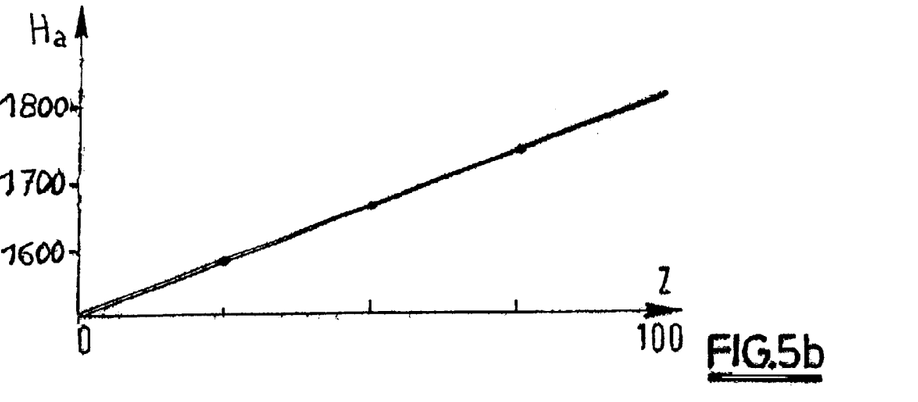
FIG. 5b shows that there is no synergy for the anisotropy field Ha, in kA/m as ordinate.
Figure 5C:
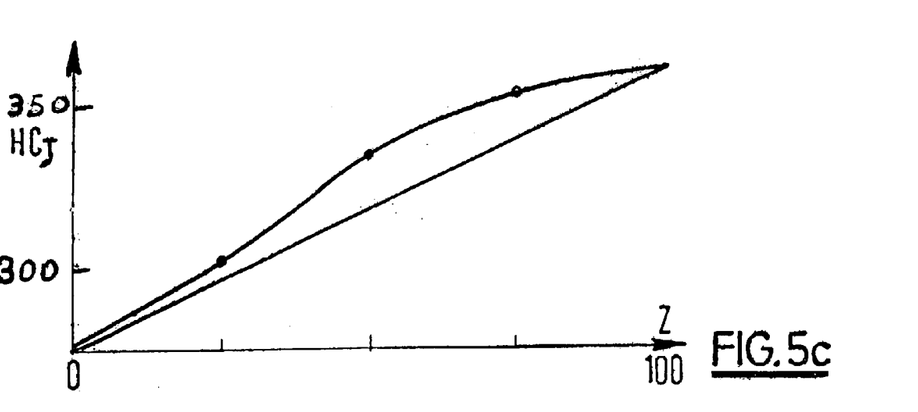
FIG. 5c shows a synergy effect for the coercive force HcJ, in kA/m, as ordinate.
Figure 6:
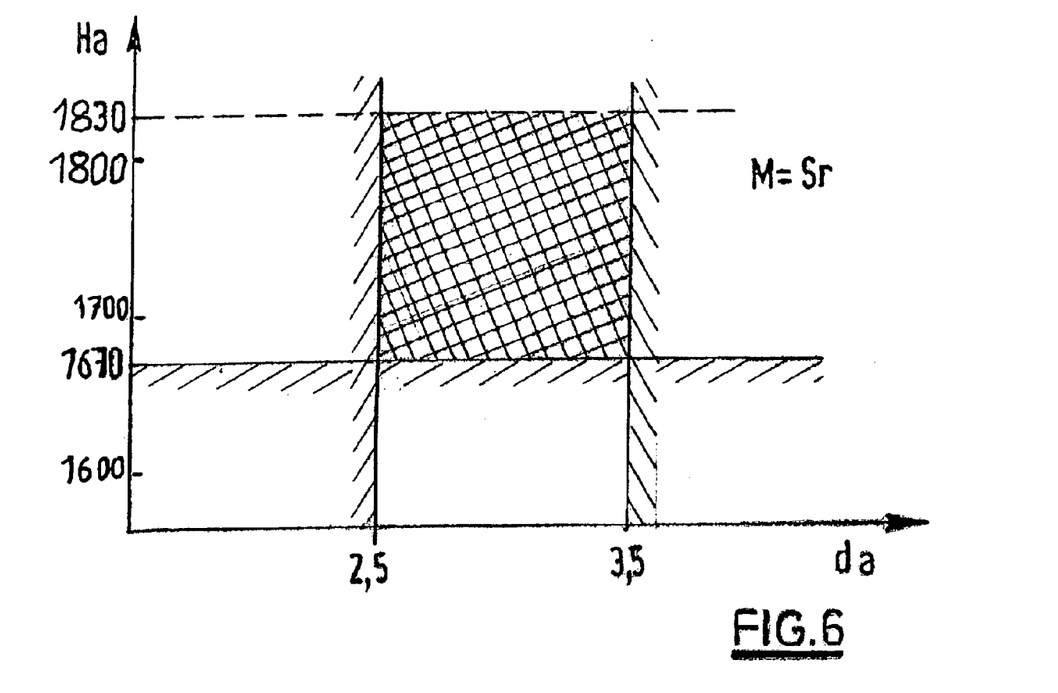
FIG. 6 shows, in synthesised form, the domain of the invention by considering the anisotropic field Ha as ordinate and the apparent density da as abscissa, of the clinker B obtained after calcination (M=Sr, R=La, T=Co) according to the method of the invention.
Figure 7:
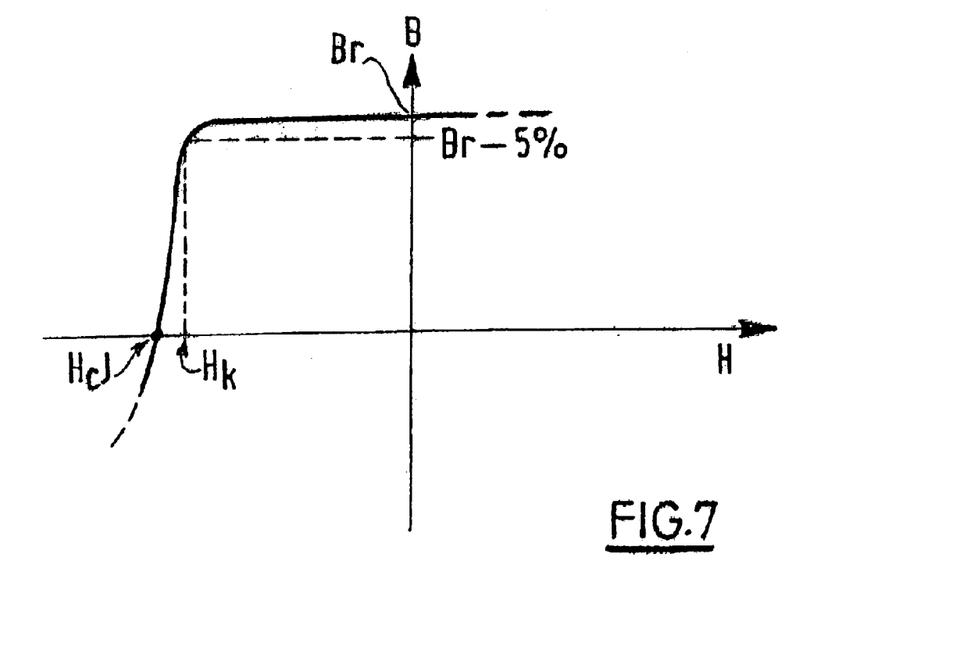
FIG. 7 shows a portion of the magnetisation curve Br=f (H), on which Hk and Hcj are indicated, in such a way as to demonstrate the significance of the ratio Hk/Hcj as a measure of the rough squareness of the magnetisation curve.

As the examples will show, and as illustrated in FIGS. 5a and 5c there appears, surprisingly, and for a reason unknown at the present time, a synergy effect as far as certain magnetic properties are concerned, certain properties being clearly greater than those envisaged by the law of mixtures and linear interpolation.

Therefore, this means is a complementary means for raising further the performance/cost ratio of ferrite magnets according to the invention.

As mentioned above, it is advantageous for the calcination stage b) to be piloted, especially as far as the calcination temperature is concerned, by measuring the apparent density of the clinker B obtained at the end of this stage b).

Another object of the invention is a method for manufacturing a ferrite powder by the method for manufacturing permanent magnets according to the invention in which, at the end of stage b), said clinker B is reduced into powder, and in which the following stages c) to f) are suppressed.

A further object of the invention constitutes permanent ferrite magnets E or F obtained by the method according to the invention and more especially by permanent magnets which have a field of anisotropy Ha at least equal to 1711 kA/m, and preferably at least equal to 1751 kA/m and even more preferably, at least equal to 1791 kA/m, or even greater than 1830 kA/m.

Another object of the invention is constituted of the motors obtained by the method according to the invention.

Examples of Embodiments
General Description of Tests

Six series of tests were carried out (tests numbered 1a, 1b, 1c to 6a, 6b and 6c) as well as 4 complementary tests (tests numbered 7 to 10), which differ by the chemical composition or the calcination temperature.

For each series of tests, one started with the same raw materials providing the elements Fe, M, R and T, and manufactured 3 mixtures of the same chemical composition:
one according to all or part of the method according to the invention: tests 1c, 3c and 5c according to the invention and tests 2c, 4c and 6c according to a part of the invention,
one according to the wet process of the state of the art: tests 1a to 6a,
and one according to the dry process of the state of the art: tests 1b to 6b.

For a same test series, one formed, at stage b), clinkers B under the same conditions, in particular with the same calcination temperature.

The method according to the invention is basically described, in its generic form, in FIG. 4.

Raw Materials

In all the examples, one begins from raw materials available on general sale, under the form of oxides for certain elements and carbonates for others:
for Fe: $Fe_2O_3$
for the element M: $SrCO_3$ or $BaCO_3$,
for the element R: $La_2O_3$,
for the element T: $Co_3O_4$.

The iron oxide $Fe_2O_3$ used had a specific surface area of 3 to 4 $m^2/g$, an apparent bulk density of 0.6 and a particle size of 0.7 $\mu m$ (Fisher measurement).

The Sr or Ba carbonates had a weight purity higher than 98%, a bulk density of 0.6 and a particle size of 1 $\mu m$ (Fisher measurement).

The La and Co oxides had a weight purity higher than at least 99% and a particle size lower than a $\mu m$ (Fisher measurement).

As far as the chemical composition is concerned, the following ferrites were manufactured:
$M_{1-x}R_xFe_{12-y}T_yO_{19}$ with M=Sr (series 1 to 4 and tests 7 to 10) or Ba (series 5 and 6) with x=y=0.2 or 0.3.

Methods

As far as stage a1) is concerned, and for the tests according to the invention and according to the dry process of the state of the art, a pulverulent mixture MP was formed in a mixer 3 of trademark EIRICH with the following parameters: mixture of a batch of 400 kg for 12 minutes at a rotation speed of 800 rev/min, completed by a mixing for 7 minutes at 400 rev/min.

But, in the method according to the invention, as drawn in FIG. 4, first of all a dry mixture MS of powders was formed corresponding to the elements Fe and M, and a fluid dispersion DF corresponding to the elements R(=La) and T(=Co), and they were introduced into the mixer 3 in a proportion of 0.17 liters of fluid dispersion DF per kg of dry mixture MS.

On the other hand, in the dry process according to the state of the art, all the powders corresponding to the elements Fe, M, R and T were introduced into the mixer 3, together with the same quantity of water as that used to form the fluid dispersion DF, namely 14% by weight of the total mixture.

As far as stage a2) is concerned, the granulation was carried out in a granulator operating continuously and producing about 400 kg of green granules per hour. The powder mixture MP was introduced continuously, in practice at 400 kg/hr, as well as granulation water at 4 l/hr, while continuously withdrawing the granules formed.

In the so-called wet process of the state of the art, the materials corresponding to the elements Fe, M, R and T were dispersed in water, as indicated below in the specific description of the trials.

As far as stage b) of calcination is concerned: for each series of tests, the same rotary furnace 5 was used, operating continuously, with an average stay of 30 minutes, and with the same experimental conditions for a same series of comparative trials. This furnace, gas heated, is 14 meters long and produces, continuously, 800 kg of clinker per hour.

The density of the clinker obtained was varied by varying the temperature of calcination according to the series, each series being noted by a temperature measured at the same point in the furnace: trials at 1180° C. (series 1 and 3), 1185° C. (series 5), 1260° C. (series 4), 1265° C. (series 2), 1270° C. (series 6).

In the case of the method according to the invention and the dry method of the state of the art, the green granules formed at stage a2) were introduced into the calcination furnace, whereas in the case of the wet process according to the state of the art, the dispersion obtained was introduced directly into the calcination furnace.

As far as stage c) is concerned, in all cases a grinding of the clinker C was carried out, first of all dry in a centrifugal mill until a particle size of 2 μm was obtained (Fisher measurement), and then in wet process in a ball mill (steel balls of 6 mm), for the time needed to obtain an average particle size of 0.8 μm (Fisher measurement), the aqueous dispersion submitted to grinding comprising 34% of water by weight.

For each trial the length of grinding time was recorded: see the test results.

During the wet processing, additives were incorporated: 1% by weight of $CaSiO_3$ and 1% by weight of $SrCO_3$, percentage taken relative to the clinker at 100% of substance.

As far as stage d) is concerned, the ground particles obtained from stage c) were compressed under a pressure of 40 MPa and under orienting magnetic field of 0.8 Tesla. Thus cylindrical blocks were obtained still comprising 12% of water, which were dried in an oven at 80° C.

As far as stage e) is concerned, the blocks obtained were sintered in an electric furnace at 1250° C. for 4 hours, in air, at atmospheric pressure.

Specific Description of the Trials

In the compositions, all the percentages are weight %.

First Series of Tests manufacture of ferrites $Sr_{1-x}La_xFe_{12-y}Co_yO_{19}$ with x, y=0.3

| | Test 1a | Test 1b | Test 1c (invention) |
|---|---|---|---|
| mixtures formed at stage a1) | wet mixture | dry mixture | 1) fluid dispersion DF |
| | $Fe_2O_3$: 33.6% | $Fe_2O_3$: 84.0% | $La_2O_3$: 22% |
| | $SrCO_3$: 3.7% | $SrCO_3$: 9.3% | $Co_3O_4$: 11% |
| | $La_2O_3$: 1.8% | $La_2O_3$: 4.5% | PEI: 2% |
| | $Co_3O_4$: 0.9% | $Co_3O_4$: 2.2% + | Water: 65% |
| | water: 60.0% | water (14% of mixture of powders) = mixture MP | 2) dry mixture MS $Fe_2O_3$: 90.0% $SrCO_3$: 10.0% = mixture MP (invention) |
| granulation at stage a2) | — | water: 1% of MP | water: 1% of MP |
| calcination at stage b) | 1180° C. | 1180° C. | 1180° C. |
| grinding (hrs) at stage c) | 14 | 8 | 10 |

Notes:
PEI is a polyethyleneimine neutralised by nitric acid
the MP mixture comprises 0.17 liters of dispersion DF per kg of MS mixture.

Second Series of Tests

This only differs from that above by the calcination temperature.

| | Test 2a | Test 2b | Test 2c |
|---|---|---|---|
| calcination at stage b) | 1265° C. | 1265° C. | 1265° C. |

Third Series of Tests manufacture of ferrites $Sr_{1-x}La_xFe_{12-y}Co_yO_{19}$ with x, y=0.2

| | Test 3a | Test 3b | Test 3c (invention) |
|---|---|---|---|
| mixtures formed at stage a1) | wet mixture | dry mixture | 1) fluid dispersion DF |
| | $Fe_2O_3$: 34.0% | $Fe_2O_3$: 85.0% | $La_2O_3$: 16% |
| | $SrCO_3$: 4.2% | $SrCO_3$: 10.6% | $Co_3O_4$: 8% |
| | $La_2O_3$: 1.2% | $La_2O_3$: 2.9% | PEI: 1% |
| | $Co_3O_4$: 0.6% | $Co_3O_4$: 1.5% + | Water: 75% |
| | water: 60.0% | water (14% of mixture of powders) = mixture MP | 2) dry mixture MS $Fe_2O_3$: 90.0% $SrCO_3$: 10.0% = mixture MP (invention) |
| granulation at stage a2) | — | water: 1% of MP | water: 1% of MP |
| calcination at stage b) | 1180° C. | 1180° C. | 1180° C. |
| grinding (hrs) at stage c) | 14 | 8 | 10 |

Notes:
PEI is a polyethyleneimine neutralised by nitric acid
the MP mixture comprises 0.16 liters of dispersion DF per kg of MS mixture.

Fourth Series of Tests

This only differs from that above by the calcination temperature.

| | Test 4a | Test 4b | Test 4c |
|---|---|---|---|
| calcination at stage b) | 1260° C. | 1260° C. | 1260° C. |

Fifth Series of Tests manufacture of ferrites $Ba_{1-x}La_xFe_{12-y}Co_yO_{19}$ with x, y=0.3

|  | Test 5a | Test 5b | Test 5c (invention) |
|---|---|---|---|
| mixtures formed at stage a1) | wet mixture | dry mixture | 1) fluid dispersion DF |
|  | $Fe_2O_3$: 32.6% | $Fe_2O_3$: 81.4% | $La_2O_3$: 21% |
|  | $BaCO_3$: 4.8% | $BaCO_3$: 12.1% | $Co_3O_4$: 10% |
|  | $La_2O_3$: 1.7% | $La_2O_3$: 4.3% | PEI: 2% |
|  | $Co_3O_4$: 0.9% | $Co_3O_4$: 2.2% + | Water: 67% |
|  | water: 60.0% | water (14% of mixture of powders) = mixture MP | 2) dry mixture MS $Fe_2O_3$: 87.0% $BaCO_3$: 13.0% = mixture MP (invention) |
| granulation at stage a2) | — | water: 1% of MP | water: 1% of MP |
| calcination at stage b) | 1180° C. | 1180° C. | 1180° C. |
| grinding (hrs) at stage c) | 14 | 8 | 10 |

Notes:
PEI is a polyethyleneimine neutralised by nitric acid
the MP mixture comprises 0.17 liters of dispersion DF per kg of MS mixture.

Sixth Series of Tests

This only differs from that above by the calcination temperature.

|  | Test 6a | Test 6b | Test 6c |
|---|---|---|---|
| calcination at stage b) | 1270° C. | 1270° C. | 1270° C. |

Test Results

Each test provided the following measurements:

A) as far as concerns the clinker B obtained at stage b), at the exit from the calcination furnace:

measurement of the field of anisotropy Ha (kA/m)

measurement of the apparent density $d_a$ measurement of the size of clinkers (equivalent diameter) with the minimum values $T_m$ and the maximum values $T_M$ in mm.

B) as far as concerns the magnet E obtained after stage e) of sintering:

measurement of the field of anisotropy Ha (kA/m)

measurement of the coercive force Hcj (kA/m)

measurement of the remanence Br (T)

measurement of the squareness of the hysteresis cycle by the ratio Hk/HcJ

These measurements were carried out on an MPS hysteresis curve recorder, apart from the field of anisotropy Ha which was measured according to the SPD technique by M. Roland Grossinger of the Vienna Technical University (Austria). All the values of these measurements are given for a temperature of 20° C.

| First series of tests |  |  |  |
|---|---|---|---|
|  | Test 1a | Test 1b | Test 1c invention |
| On clinker B: |  |  |  |
| Field of anisotropy Ha | 1830 | 1552 | 1830 |
| Apparent density | 2.8 | 2.2 | 2.8 |
| Area diameter | 0.3–12 | 4.2–5.3 | 4.1–5.1 |
| On final magnet: |  |  |  |
| Field of anisotropy Ha | 1815 | 1560 | 1830 |
| Coercive force HcJ | 358 | 318 | 358 |
| Remanence Br | 0.40 | 0.39 | 0.42 |
| Squareness (Hk/HcJ %) | 87 | 80 | 92 |

It should be noted that the field of anisotropy Ha is very high in the case of tests 1a and 1c (according to the invention) and that this value of Ha is approximately equal to the near value for the value obtained by the "theoretical" curve of FIG. 2, for x=0.3.

According to the applicant, the poor relative performances of the magnets in test 1a compared to those of test 1c could come from too wide a dispersion of the size of the clinker granules: these granules have an equivalent diameter which varies in a ratio 1 to 40, such that grinding leads to the formation of too large a quantity of ultra-fine particles which are not oriented at stage d). On the other hand, the poor relative performances of the magnets of test 1b compared to those of test 1c could come from the lack of homogeneity of the chemical composition, if one compares the values of Ha and of the apparent density, too low compared to those of test 1c.

It can be noted that the sintering process does not modify the value of Ha very much, such that the values of Ha measured on the clinker are practically the same as those measured on the final magnet.

| Second series of tests |  |  |  |
|---|---|---|---|
|  | Test 2a | Test 2b | Test 2c invention |
| On clinker: |  |  |  |
| Field of anisotropy Ha | 1830 | 1632 | 1830 |
| Apparent density | 3.8 | 2.8 | 3.8 |
| Area diameter | 1.2–12 | 4.0–5.2 | 4.0–5.1 |
| On final magnet: |  |  |  |
| Field of anisotropy Ha | 1830 | 1616 | 1847 |
| Coercive force HcJ | 358 | 326 | 358 |
| Remanence Br | 0.41 | 0.42 | 0.41 |
| Squareness (Hk/HcJ %) | 82 | 87 | 87 |

None of these tests shows optimised performances: in the case of tests 2a and 2c, the apparent density obtained, too high, led to a very long grinding time (18 hours), which no doubt resulted in the formation of too high a quantity of ultra-fine particles. As for test 2b, it is slightly better than test 2a, but its chemical composition still lacks homogeneity. The method according to the invention excludes high calcination temperatures which lead to a clinker with too great apparent density.

It is observed, only in the case where the clinker has a relatively low value (test 2b), that there is a slight rise in the value of Ha when the calcination temperature is raised.

Third series of tests

|  | Test 3a | Test 3b | Test 3c invention |
|---|---|---|---|
| On clinker: | | | |
| Field of anisotropy Ha | 1735 | 1552 | 1735 |
| Apparent density | 2.8 | 2.2 | 2.8 |
| Area diameter | 0.5–11 | 4.3–5.2 | 25 4.0–5.1 |
| On final magnet: | | | |
| Field of anisotropy Ha | 1727 | 1544 | 1727 |
| Coercive force HcJ | 342 | 318 | 342 |
| Remanence Br | 0.40 | 0.39 | 0.42 |
| Squareness (Hk/HcJ %) | 85 | 82 | 93 |

The comments made concerning the first series of tests also apply to the third series of tests. Test 3c is slightly superior to test 1c Fourth series of tests

|  | Test 4a | Test 4b | Test 4c invention |
|---|---|---|---|
| On clinker: | | | |
| Field of anisotropy Ha | 1735 | 1608 | 1735 |
| Apparent density | 3.8 | 2.8 | 3.8 |
| Area diameter | 1.2–12 | 4.0–5.2 | 4.0–5.1 |
| On final magnet: | | | |
| Field of anisotropy Ha | 1727 | 1830 | 1727 |
| Coercive force HcJ | 342 | 326 | 342 |
| Remanence Br | 0.40 | 0.42 | 0.41 |
| Squareness (Hk/HcJ %) | 83 | 86 | 86 |

The comments made concerning the second series of tests also apply to the fourth series of tests. There is little difference between the results of these two series.

Fifth series of tests

|  | Test 5a | Test 5b | Test 5c invention |
|---|---|---|---|
| On clinker: | | | |
| Field of anisotropy Ha | 1568 | 1432 | 1568 |
| Apparent density | 2.8 | 2.2 | 2.8 |
| Area diameter | 0.4–12 | 4.2–5.2 | 4.1–5.3 |
| On final magnet: | | | |
| Field of anisotropy Ha | 1568 | 1448 | 1560 |
| Coercive force HcJ | 279 | 255 | 279 |
| Remanence Br | 0.41 | 0.40 | 0.43 |
| Squareness (Hk/HcJ %) | 85 | 82 | 92 |

The comments made concerning the first series of tests also apply to the fifth series of tests.

Test 5c is inferior to test 1c because, intrinsically, the substituted ferrite of Ba has a field of anisotropy Ha lower than that of the substituted ferrite of Sr, for a same value of x and y, as shown in FIGS. 2 and 3.

Sixth series of tests

|  | Test 6a | Test 6b | Test 6c invention |
|---|---|---|---|
| On clinker: | | | |
| Field of anisotropy Ha | 1568 | 1472 | 1568 |
| Apparent density | 3.8 | 2.8 | 3.8 |
| Area diameter | 1.2–12 | 4.0–5.2 | 4.0–5.1 |
| On final magnet: | | | |
| Field of anisotropy Ha | 1568 | 1472 | 1560 |
| Coercive force HcJ | 279 | 263 | 279 |
| Remanence Br | 0.41 | 0.40 | 0.43 |
| Squareness (Hk/HcJ %) | 80 | 84 | 85 |

The comments made concerning the second series of tests also apply to the sixth series of tests. However, as shown concerning the fifth series of tests, the performances of this series are inferior to those of the second series because of the substitution of Sr by Ba.

General Conclusions from These Series of Tests

On the one hand, the combination of means according to the invention, that is a technique for forming granules homogeneous in chemical composition and in size, coupled with calcination conditions leading to a density in a predetermined area, lead to results greatly superior to those obtained with procedures of prior art, in the case of substituted ferrites.

On the other hand, the present invention shows that substituted ferrites of formula $M_{1-x}R_xFe_{12-y}T_yO_{19}$ have optimum magnetic properties in a narrow domain for x and y close to 0.2, other series of tests carried out for x, y=0.1 having led to results slightly inferior to those obtained with x, y=0.2.

Tests on Mixtures of Ferrites

In this series of tests, a first paste or aqueous dispersion of a first clinker B was prepared, obtained at the end of stage c), corresponding to test 1c (M=Sr, R=La, T=Co and x=y= 0.3, namely a ferrite of Sr substituted by La and Co), and a second paste or aqueous dispersion of a second clinker B', obtained at the end of stage c), and corresponding to another test (test 7) (M=Sr, x=y=0, namely a non-substituted ferrite of Sr).

Mixtures of these two pastes were made in function of z, specific mass proportion of the first clinker B of formula $Sr_{1-x}La_xFe_{12-y}Co_yO_{19}$ in the mixture of the two clinkers B and B' ($Sr_{1-x}La_xFe_{12-y}Co_yO_{19}$+$SrFe_{12}O_{19}$), according to the following tests 8 to 10. Next, stages d and the following were continued in order to obtain magnets whose properties were measured as in the preceding tests:

| Test | 7 | 8 | 9 | 10 | 1c recall |
|---|---|---|---|---|---|
| z (% of B) | 0 | 25 | 50 | 75 | 100 |
| Field of anisotropy Ha | 1512 | 1592 | 1671 | 1751 | 1830 |
| Coercive force HcJ | 268 | 291 | 321 | 337 | 344 |
| Remanence Br | 0.42 | 0.42 | 0.42 | 0.42 | 0.42 |
| Squareness(Hk/HcJ %) | 80 | 87 | 93 | 93 | 92 |

Conclusions: as shown in FIGS. 5a and 5c, one obtains, for mixtures of substituted and non-substituted ferrites, values for HcJ and a ratio Hk/HcJ which are superior to those expected by the law of mixtures. Thus, taking into account the high cost of the substitution elements (La and Co) in the ferrites, it is therefore evident that the same performance level can be obtained for lower cost. This embodiment of the invention advantageously completes and furthermore adds value to the manufacturing method according to the invention. It also makes it possible to manufacture magnets in which an expensive material (ferrite substituted by La and Co) is "diluted" by a relatively low-priced material (non-substituted ferrite) while only reducing in a very limited way the final magnetic properties, which was completely unexpected.

This embodiment according to the invention can be applied in domains where the ratio performance/cost is more significant than the performance criterion alone.

Advantages of the Invention

Firstly, the invention reveals a general method for manufacturing substituted ferrites which is applicable to all substituted ferrites of the general formula $M_{1-x}R_xFe_{12-y}T_yO_{19}$.

Next, the invention demonstrates how to modify manufacturing methods known in prior art in order to make the best of these ferrites, whose intrinsic performances vary according to the nature of the elements M, R and T, in such a way as to obtain ferrites with optimised magnetic properties.

Furthermore, it is important to note that the method according to the invention uses practically only equipment or means already well known to those skilled in the art, which makes it possible to manufacture ferrites according to the invention with almost no specific investments, the means used by the method according to the invention being used normally by the manufacturers of ferrite type magnets.

Moreover, the manufacturing costs are lower with the method according to the invention, all other things being equal. In fact, since the calcination conditions are less demanding (lower temperature and lower length of time) than those usually used, this stage, called stage b), is more economical in the method according to the invention than in the traditional method. The same applies to the grinding stage, called stage c), the length of grinding making it possible to obtain a predetermined particle size, typically of 0.8 $\mu$m, in a shorter time with the method according to the invention, which makes it possible to obtain sintering clinkers thanks to their density ranging around a predetermined area.

Furthermore, the present invention reveals the interest of having substituted ferrites of the formula $M_{1-x}R_xFe_{12-y}T_yO_{19}$ which give optimum performances in a narrow domain of values for x and y, typically around 0.2±0.1, or preferably around 0.2±0.05, in the case where M=Sr, R=La and T=Co, even though, on the base of values of the field of anisotropy Ha of FIGS. 2 and 3, everything seemed to point to choosing x and y higher than 0.35.

Finally, the invention makes it possible, for approximately the same magnetic performance, to lower the costs of the magnets, by "diluting" an "expensive" clinker with substituted ferrite base, by an "economical" clinker with a non-substituted ferrite base.

Thus, generally, the invention makes, it possible to provide the best possible quality/price ratio for a given generic formula $M_{1-x}R_xFe_{12-y}T_yO_{19}$ which is of great interest both technically and economically.

LIST OF REFERENCES

1 Dry mixer
2 Liquid phase disperser
3 Powder mixer
4 Granulator
5 Calcination furnace
6 Clinker grinder-disperser

What is claimed is:

1. Manufacturing method for permanent magnets of the ferrite type comprising a magnetoplumbite phase of formula $M_{1-x}R_xFe_{12-y}T_yO_{19}$ in which M=Ba, Sr, Ca or Pb, R=Bi or other elements of the rare earths family, T=Mn, Co,Ni, Zn, with x and y comprised between 0.05 and 0.5, comprising the steps of:

a1) forming in a mixing means, a pulverulent mixture MP of raw materials related to the elements M, R, Fc and T, comprising water in a predetermined quantity, a2) transforming said mixture into green granules A, with an optional addition of extra water, b) calcining said green granules in a calcination furnace (5) to form a clinker B, with a magnetoplumbite phase base of formula $M_{1-x}R_xFe_{12-y}T_yO_{19}$, c) wet grinding said clinker, to obtain a homogeneous dispersion C of fine de-agglomerated particles of average particle size less than 1.2 um, d) concentrating and compressing said particles under an orienting magnetic field to form a green compact D, anisotropic, able to be manipulated and of predetermined shape, e) sintering said anisotropic green compact D to obtain a sintered element E, and f) dimensions optionally dimensioning the final size of said sintered element E, wherein:

1) at stage a1) of the method, forming said mixture MP, by introducing into said mixing means (3), a dry mixture MS of powders corresponding to said raw materials relative to the elements M and Fe, and a homogeneous fluid dispersion DF of said raw materials relative to the elements R and T; and 2) at stage b) of the method, calcining said green granules A at a chosen temperature and for a chosen length of time, in such a way as to obtain, at the exit from the calcination furnace (5) at the end of stage b), a clinker B which is both homogeneous in chemical composition and size, and of low apparent density, comprised between 2.5 and 3.5 and which can be ground easily during stage c).

2. Method according to claim 1 in which said fluid dispersion comprises:

water: 55 to 85% by weight
element R (expressed in oxide form): 10 to 30% by weight
element T (expressed in oxide form): 5 to 15% by weight.

3. Method according to one claim 1 in which said fluid dispersion DF comprises a deflocculating agent or dispersing agent, in such a way as to obtain a dispersion with both low viscosity and a state of fine dispersion, the average sizes of the particles or agglomerates relative to elements R and T being less than 25 $\mu$m.

4. Method according to claim 3 in which said fluid dispersion DF comprises said deflocculating or dispersing agent with a weight content comprised between 0.5 and 2%.

5. Method according to claim 1 in which said dry mixture of powders MS and said fluid dispersion DF is introduced into said mixer, 0.1 to 0.2 liters of said fluid dispersion DF being introduced per kilogram of said dry mixture MS.

6. Method according to claim 1 in which, at stage b), said calcination is carried out at a temperature and for a length of time chosen in order to obtain a clinker B of apparent density $d_a$ ranging from 2.7 to 3.1.

7. Method according to claim 6 in which said calcination is carried out at a temperature and for a time selected to obtain a clinker B of apparent density $d_a$ of 2.75 to 3.

8. Method according to claim 1 in which the elements M, R, T and the values x and y are selected in such a way that, at the end of stage b), said clinker B has an anisotropy value Ha at least equal to 1592 kA/m at 20° C.

9. Method according to claim 8 in which the elements M, R, T and the values x and y are selected in such a way that, at the end of stage b), said clinker B has an anisotropy value Ha at least equal to 1671 kA/m at 20 ° C.

10. Method according to claim 1 in which M=Sr, R=La and T=Co.

11. Method according to claim 1 in which x=y.

12. Method according to claim 1 in which x and y are between 0.10 and 0.35.

13. Method according to claim 12 in which x and y are between 0.15 and 0.25.

14. Method according to claim 1 in which, in stage d), said particles are compressed under a pressure of 30–50 MPa under an orienting magnetic field of about 1 Tesla.

15. Method according to claim 1 in which:
 1) a clinker B' of formula $MFe_{12}O_{19}$ is provided,
 2) said clinker B' is mixed with said clinker B, in such a way as to obtain permanent magnets.

16. Method according to claim 15 in which the weight proportion z of clinker B in the mixture of the two clinkers B and B' is between 0.20 and 0.80.

17. Method according to claim 16 in which the weight proportion z is between 0.30 and 0.70.

18. Method according to claim 15 in which said clinker B' has an apparent density $d_a$ between 2.5 and 3.5.

19. Method according to claim 1 in which calcination temperature in stage b) controlled by measuring the apparent density $d_a$ of the clinker obtained at the end of stage b).

20. Method for manufacturing a ferrite powder comprising a magnetoplumbite phase of formula $M_{1-x}R_xFe_{12-y}T_yO_{19}$ in which M=Ba, Sr, Ca or Pb, R=Bi or other elements of the rare earths family, T=Mn, Co,Ni, Zn, with x and y comprised between 0.05 and 0.5, comprising the steps of:

a1) forming in a mixing means, a pulverulent mixture MP of raw materials related to the elements M, R, Fe and T, comprising water in a predetermined quantity.

a2) transforming said mixture into green granules A, with an optional addition of extra water, and b) calcining said green granules in a calcination furnace (5) to form a clinker B, with a magnetoplumbite phase base of formula $M_{1-x}R_xFe_{12-y}T_yO_{19}$, wherein:
  1) at stage a1) of the method, forming said mixture MP, by introducing into said mixing means (3), a dry mixture MS of powders corresponding to said raw materials relative to the elements M and Fe, and a homogeneous fluid dispersion DF of said raw materials relative to the elements R and T and
  2) at stage b) of the method, calcining said green granules A at a chosen temperature and for a chosen length of time, in such a way as to obtain, at the exit from the calcination furnace (5) at the end of stage b), a clinker B which is both homogeneous in chemical composition and size, and of low apparent density, comprised between 2.5 and 3.5.

* * * * *